(12) United States Patent
Ortiz De Zaratte et al.

(10) Patent No.: US 7,438,942 B2
(45) Date of Patent: Oct. 21, 2008

(54) HARD SUGAR COATING METHOD

(75) Inventors: Dominique Ortiz De Zaratte, Merville (FR); Guillaume Ribadeau-Dumas, Verlinghem (FR)

(73) Assignee: Roquette Freres, Lestrem (FR)

( * ) Notice: Subject to any disclaimer, the term of this patent is extended or adjusted under 35 U.S.C. 154(b) by 547 days.

(21) Appl. No.: 10/374,031

(22) Filed: Feb. 25, 2003

(65) Prior Publication Data

US 2004/0166231 A1  Aug. 26, 2004

Related U.S. Application Data

(63) Continuation of application No. PCT/FR02/02164, filed on Jun. 21, 2002.

(30) Foreign Application Priority Data

Jun. 25, 2001  (FR) ................... 01 08362

(51) Int. Cl.
*A23L 1/164* (2006.01)
(52) U.S. Cl. ................. 426/439; 426/5; 426/292; 426/303
(58) Field of Classification Search ........ 426/5, 426/3; 424/464
See application file for complete search history.

(56) References Cited

U.S. PATENT DOCUMENTS

| | | | |
|---|---|---|---|
| 4,238,510 A | 12/1980 | Cherukuri et al. | |
| 4,317,838 A * | 3/1982 | Cherukuri et al. | 426/5 |
| 4,792,453 A | 12/1988 | Reed et al. | |
| 4,840,797 A | 6/1989 | Boursier | |
| 5,248,508 A * | 9/1993 | Reed et al. | 426/5 |
| 5,270,061 A | 12/1993 | Reed et al. | |
| 5,376,389 A | 12/1994 | Reed et al. | |
| 5,478,593 A * | 12/1995 | Serpelloni et al. | 427/2.14 |
| 5,527,542 A | 6/1996 | Serpelloni et al. | |
| 5,952,019 A * | 9/1999 | Yatka et al. | 426/3 |
| 5,965,162 A * | 10/1999 | Fuisz et al. | 424/464 |
| 6,180,143 B1 | 1/2001 | Rapp et al. | |
| 6,783,779 B2 * | 8/2004 | Rapp et al. | 426/5 |

FOREIGN PATENT DOCUMENTS

| | | |
|---|---|---|
| CA | 2123651 | 11/1994 |
| EP | 0 273 000 | 6/1988 |
| EP | 0 813 817 | 12/1997 |

* cited by examiner

*Primary Examiner*—M P Woodward
*Assistant Examiner*—Bethany Barham
(74) *Attorney, Agent, or Firm*—Young & Thompson

(57) ABSTRACT

The invention relates to a hard sugar coating method comprising a step in which a sugar coating syrup is applied, said syrup consisting of maltitol or isomalt and at least one binder, characterized in that all or part of the dry matter of said binder is substituted by a sorbitol syrup or power in order to reduce the fragility of said sugar-coated products.

14 Claims, No Drawings

HARD SUGAR COATING METHOD

CROSS-REFERENCE TO RELATED APPLICATIONS

This application is a Continuation of International Patent Application PCT No. FR 02/02164 filed Jun. 21, 2002; claiming priority of French Appln. No. FR 01 08362, filed Jun. 25, 2001.

The invention relates to an improved method for hard coating and to the coated products thus obtained.

More precisely, the subject of the invention is a method for hard coating with maltitol or with isomalt which makes it possible to reduce the brittleness of the coated products.

Hard coating is a unit operation used in a good number of fields and in particular in the confectionery or pharmaceutical field. It may also involve the industry for additives such as flavorings, thickeners, vitamins, enzymes, acids and plant-based products. This operation consists in creating a hard coating at the surface of solid or pulverulent products so as to protect them for various reasons or so as to make them more attractive visually or tastewise.

Hard coating aims to obtain a crisp and sweet layer which is always greatly appreciated in the case of confectionery products such as chewing gums.

It always requires the use of a syrup containing crystallizable materials. The hard and crystalline coating is obtained by applying this syrup and evaporating the water provided by it. This application should be repeated a large number of times so as to obtain the desired degree of size increase.

Among the various types of sugar-free coating using polyols, hard coating with maltitol or with isomalt are the most satisfactory in terms of hardness and crispness in particular and make it possible to obtain products which are completely similar to those obtained with pure sucrose.

There may be mentioned in particular the coating method described in patent EP-B1-0,201,412, whose applicant is the proprietor.

This technique, however, despite the improvements which have been made to it, such as in particular those described in patent EP-B1-0,625,311, of which the applicant is also proprietor, has the disadvantage of giving coated products which are susceptible to breaking. That is the case in particular for chewing gums in the form of coated cushions for which a phenomenon of breaking at the corners of the cushions is observed after handling of the products.

To the knowledge of the applicant, there are currently no viable technical solutions which make it possible to reduce the breaking of products coated with maltitol or with isomalt.

Wishing to improve the state of the art, the applicant therefore focused on remedying this deficiency and it is after long research studies that it observed that it was possible, surprisingly and unexpectedly, to obtain hard coatings with maltitol or with isomalt which were particularly improved as regards their resistance to breaking, provided all or some of the binding agent commonly used in the coating syrup is replaced by sorbitol introduced in syrup form or in powder form. The expression binding agent for the purposes of the present invention is understood to mean compounds such as gum arabic, gum talha, gelatin, modified starches and celluloses, dextrins, maltodextrins, branched maltodextrins and hydrogenated starch hydrolysates which persons skilled in the art are accustomed to using in coating syrups.

The subject of the invention is therefore a method for hard coating comprising a step of applying a coating syrup composed of maltitol or isomalt and at least one binder, characterized in that all or some of the dry matter content of said binder is replaced by a sorbitol syrup or powder so as to reduce the brittleness of the products thus coated.

According to a general embodiment of the invention, the method consists in homogeneously moistening the surface of the products to be coated in motion in a coating pan with the aid of said syrup for coating with maltitol or with isomalt.

One variant of the method according to the invention consists in then adding, in pulverulent form, a quantity of maltitol or isomalt powder of high purity, preferably greater than 90% by weight, and still more preferably greater than 95% by weight. This distribution step and the application step may be carried out in any order.

After distribution of the powder and optional drying of the whole, a new moistening-powder supply cycle may be carried out. The method requires at least one, but preferably at least two applications, in pulverulent form, of a maltitol or isomalt powder of high purity. These applications may be carried out during the same cycle or during different cycles, bearing in mind that a cycle is defined in the present invention as comprising only one application of the maltitol or isomalt syrup.

It should be noted that the products to be coated may be optionally gummed beforehand according to conventional techniques known to persons skilled in the art.

Another variant of the invention consists in carrying out a multilayer coating, using several polyols; the replacement of the binder in this case will involve the coating layer comprising the maltitol or the isomalt.

Of course, it is possible finally to carry out conventional polishing in order to improve the appearance of the products. In this case, fatty substances, lacquers or waxes are used, for example.

As regards the maltitol or the isomalt entering into the composition of the coating syrup it is preferable that they are present in an amount of at least 80%, preferably of at least 88% by weight relative to the dry matter content of said coating syrup.

As regards the quantity of sorbitol syrup or of powdered sorbitol used for replacing the binder, it is preferable that it represents 1 to 5% by dry weight of the dry matter content of the coating syrup(s).

Any commercial sorbitol syrup is quite suitable; it would be possible in particular to directly use the products marketed under the trade marks NEOSORB® 70/05, 70/02, 70/70. In all cases, said syrup may be prepared from a powder. It is generally preferable that this syrup has a dry matter content of about 70%.

Any commercial powdered sorbitol is also suitable.

Good results have also been obtained with other syrups of hydrogenated monosaccharides having a molecular weight of less than or equal to 182 g/mol, such as for example mannitol, xylitol, erythritol, glycerin.

As regards the binder, it preferably represents up to 15% by dry weight of the dry matter content of the coating syrup. Preferably, said binder is chosen from the group consisting of gum arabic, gum talha, gelatin, modified starches and celluloses, dextrins, maltodextrins, branched maltodextrins and hydrogenated starch hydrolysates, alone or as a mixture with each other.

The coating syrup may also contain pigments such as calcium carbonate, titanium oxide, or a food coloring, and intense sweeteners such as aspartame, acesulfame K, saccharin, sucralose, alitame, neotame, neohesperidin, thaumatin, sodium or calcium cyclamate.

The method in accordance with the invention makes it possible to coat all types of products, such as in particular food products such as confectionery products, chewing gums, bubble gums, tablets, lozenges, jelly products, chewy pastes, hard sweets, chocolate products, dried fruits such as almonds, hazelnuts, pharmaceutical or veterinary products such as pills or tablets, products for animals, dietetic products such as plant granules, seeds or seed grains, agglomerated fertilizer powders, additives based on enzymes or microorganisms such as yeasts, detergent tablets, vitamins, flavorings, perfumes, acids, sweeteners or various active ingredients.

The use of the invention as described above makes it possible to simply obtain coated products which are particularly resistant to breaking, with relatively short coating times for a degree of size increase of about 30%.

The invention will be understood more clearly with the aid of the following examples, which are intended to be illustrative and nonlimiting.

EXAMPLE 1

Comparison of the Method in Accordance with the Invention with Prior Art Methods Sugar-free chewing gums having the shape of cushions 2 centimeters in length by 1 centimeter in width approximately are coated according to the methods described in patents EP-B1 0,201,412 (Control 1) and EP-B1-0,625,311 (Control 2).

The same products are then coated according to the same methods, but replacing the binder according to the invention (Trials 1 and 2).

The following are used for the coatings:
  a coating syrup containing 70% dry matter in which the dry matter contains 93% maltitol on a dry basis, 6% gum arabic and 1% titanium oxide. (controls)
  the same syrup in which 1.5% of the gum arabic is replaced by 1.5% dry matter content of a sorbitol syrup NEOSORB® 70/02. The gum arabic content therefore becomes 4.5% on a dry basis. (trials)
  powdered maltitol (MALTISORB® P35) for the control and trials 1 and 2.

Trial and Control 1

50 kg of centers to be coated are placed in a rotating coating machine of the DRIACOATER 1200 type, and the coating syrup is sprayed at 75° C. at the rate of 12 g/kg of centers. It is allowed to spread out for 30 seconds, and then 10 g of MALTISORB® P35 are added per kg of centers and allowed to spread out for 30 seconds, and then dried for 3 minutes with air at 27° C. The addition of syrup is repeated, gradually increasing the quantity of syrup up to 16 g/kg of centers, and the steps of distribution (30 seconds to 2 minutes) and drying (1.5 to 4 minutes) are repeated until a coating level of about 30% is obtained. 8 g of MALTISORB® P35 are added after distribution of the $2^{nd}$, $3^{rd}$, $4^{th}$ and $5^{th}$ addition of syrup. This powder is allowed to spread out for 30 seconds before drying.

Polishing is then carried out with carnauba wax.

Trial and Control 2

The coating syrup containing 70% dry matter is sprayed at 75° C. over the centers in rotation in the DRIACOATER 1200 coating pan at the rate of 14 to 16 g per kg of centers at the start of the cycle, of 18 to 22 g per kg in the middle of the cycle and of 8 to 16 g per kg at the end of the cycle.

It is allowed to spread out for 30 seconds and then there are dusted 6 to 7 g of powdered maltitol per kg of centers at the start of the cycle, 2 to 4 g of maltitol per kg of centers in the middle of the cycle, 0 g at the end of the cycle and allowed to spread out for 30 seconds at the start of the cycle or 30 to 90 seconds in the middle of the cycle, without drying with an air stream during all the cycles. These operations are repeated until a degree of size increase of about 30% is obtained. Polishing is then carried out with carnauba wax.

Evaluation of the Brittleness of the Finished Products by Means of a Breaking Test This test consists in dropping 50 coated chewing gums from a height of 1 meter onto a metal surface and in counting the corners broken.

The results are expressed as the number of corners broken at the end of the test for a total of 200 corners, after 24 or 96 hours of storage of the coated chewing gums and 50% relative humidity and 20° C.

|  | CONTROL 1 | TRIAL 1 | CONTROL 2 | TRIAL 2 |
| --- | --- | --- | --- | --- |
| After 24 h | 20 | 7 | 25 | 6 |
| After 96 h | 51 | 20 | 42 | 8 |

These results indeed illustrate the notable decrease in the brittleness of the products according to the invention (TRIALS). The products obtained are smoother than the controls and are crisp and shiny.

The invention claimed is:

1. A method for hard coating chewing-gum cushions comprising a step of applying a crystallizable coating syrup composed of maltitol or isomalt and at least one binder to said cushions, comprising replacing some of the dry matter content of said binder by a sorbitol syrup or powder, wherein the crystallizable coating syrup comprises 1 to 5% by dry weight of the total dry matter content of a sorbitol syrup or of a sorbitol powder in an amount sufficient to reduce the brittleness of the cushions thus coated.

2. The method as claimed in claim 1, wherein said binder is selected from the group consisting of gum Arabic, gum talha, gelatin, modified celluloses, modified starches, dextrins, maltodextrins, branched maltodextrins, and mixtures thereof.

3. The method as claimed in claim 1, wherein said binder represents up to 15% by dry weight of the dry matter content of said coating syrup.

4. The method as claimed in claim 1, wherein the product for coating is a food, veterinary or pharmaceutical product, or a dietetic product.

5. The method as claimed in claim 1, wherein said coating syrup comprises, relative to its soluble dry matter content, at least 80% by dry weight of maltitol or isomalt.

6. The method as claimed in claim 5, wherein said coating syrup comprises, relative to its soluble dry matter content, at least 88% by dry weight of maltitol or isomalt.

7. A method for hard coating chewing-gum cushions, comprising:
  applying a crystallizable coating syrup to the cushions in an amount sufficient to reduce the brittleness of the cushions, wherein the crystallizable coating syrup comprises i) at least 80% of maltitol or isomalt by weight relative to the dry matter content of the coating syrup, ii) 1 to 5% a sorbitol syrup or of a sorbitol powder by weight relative to the dry matter content of the coating syrup, and iii) at least one binder.

8. The method as claimed in claim 7, wherein said binder is selected from the group consisting of gum Arabic, gum talha, gelatin, modified celluloses, modified starches, dextrins, maltodextrins, branched maltodextrins, and mixtures thereof.

9. The method as claimed in claim 7, wherein said binder represents up to 15% by dry weight of the dry matter content of said coating syrup.

10. The method as claimed in claim 7, wherein the product for coating is a food, veterinary or pharmaceutical product, or a dietetic product.

11. A method for hard coating chewing-gum cushions, comprising:
  applying a crystallizable coating syrup to the cushions in an amount sufficient to reduce the brittleness of the cushions, wherein the crystallizable coating syrup comprises i) at least 88% of maltitol or isomalt by weight relative to the dry matter content of the coating syrup, ii) 1 to 5% a sorbitol syrup or of a sorbitol powder by weight relative to the dry matter content of the coating syrup, and iii) at least one binder.

12. The method as claimed in claim 11, wherein said binder is selected from the group consisting of gum Arabic, gum talha, gelatin, modified celluloses, modified starches, dextrins, maltodextrins, branched maltodextrins, and mixtures thereof.

13. The method as claimed in claim 11, wherein the product for coating is a food, veterinary or pharmaceutical product, or a dietetic product.

14. A method for hard coating chewing-gum cushions, comprising:

applying a crystallizable coating syrup to the cushions in an amount sufficient to reduce the brittleness of the cushions, wherein the crystallizable coating syrup comprises i) maltitol or isomalt by weight relative to the dry matter content of the coating syrup, ii) 1 to 5% a sorbitol syrup or of a sorbitol powder by weight relative to the dry matter content of the coating syrup, and iii) at least one binder.

* * * * *